US006416607B1

United States Patent

(12) United States Patent
Tsai et al.
(10) Patent No.: US 6,416,607 B1
(45) Date of Patent: Jul. 9, 2002

(54) AUTOMATIC EMBOSSING DEVICE FOR PLASTIC FLOOR TILE

(75) Inventors: Lang-Fu Tsai, Hsinchu; Hsiang-Nien Chung, Hsinchu Hsien; Chung-Hsin Hsiao, Chia I Hsien, all of (TW)

(73) Assignee: Industrial Technology Research Institute, Hsin Chu Hsien (TW)

( * ) Notice: Subject to any disclaimer, the term of this patent is extended or adjusted under 35 U.S.C. 154(b) by 0 days.

(21) Appl. No.: 09/440,251

(22) Filed: Nov. 15, 1999

(51) Int. Cl.[7] .......................... B29C 59/04; B32B 31/08

(52) U.S. Cl. ....................... 156/209; 156/351; 156/361; 156/378; 156/219

(58) Field of Search ................................ 156/209, 219, 156/351, 361, 378, 582

(56) References Cited

U.S. PATENT DOCUMENTS 4,773,959 A * 9/1988 Smith et al. ................ 156/351

FOREIGN PATENT DOCUMENTS

TW 411317 A * 11/2000

* cited by examiner

*Primary Examiner*—Sam Chuan Yao
(74) *Attorney, Agent, or Firm*—Rosenberg, Klein & Lee

(57) ABSTRACT

An automatic embossing device for plastic floor tile comprises a main frame, a pressing wheel module, a tape supply control wheel module, a position mark sensing module, a tape tension-balancing module, and a tape supply module. When the pressing process for plastic floor tile is performed, the rotation speed of the pressing wheel is first set. The rotation speed of the tape supply control wheel is then set. A zero-point position of rotation angle on the pressing wheel is randomly set. A computer is used to partition and determine a plurality of angle positions; The computer is used to compare the signal of the angle position to that of the position mark on the printed tape to obtain a time difference when the pressing process starts. A distance difference is obtained from the time difference. The computer is used to calculate out the speed compensation according to the rotation speed of the tape supply, control wheel and to adjust immediately the rotation speed of the tape supply control wheel. The angle position and the position mark on the printed tape can thus be kept synchronous at any time. The shift between the pattern on the pressing wheel and the printed pattern on the tape is input to the computer. The computer uses the shift to adjust automatically the zero-point position of rotation angle on the pressing wheel. The pattern on the pressing wheel overlaps the printed pattern on the tape. Normal position adjustment process is then performed. The rotation is thus automatic and continuous.

4 Claims, 3 Drawing Sheets

AUTOMATIC EMBOSSING DEVICE FOR PLASTIC FLOOR TILE

FIELD OF THE INVENTION

The present invention relates to an automatic embossing device and method for plastic floor tile, especially to an automatic embossing device and method with characteristics of .higher accuracy, greater stability, and better production efficiency for plastic floor tile.

BACKGROUND OF THE INVENTION

The plastic floor tile is formed by bonding a base substratum, an intermediate laminar, and a printed tape. A layer of thin tape or thick tape can be further attached. In order to exhibit the modeling of the printed pattern on the tape, an embossing process is needed. The conventional embossing process uses an encoder to sense the supply speed of printed tape and uses a computer to compare the speed of the pressing wheel (or the bonding wheel) for synchronously controlling the embossing process. Moreover, a position sensor is used to sense the position mark on the printed tape. When the sensed cumulative error exceeds a certain quantity, a breaking or decelerating action is done to stretch the tape for performing a postponed adjustment process.

The polyvinyl chloride (PVC) tape is generally adopted as the printed tape in the conventional automatic embossing technology for the plastic floor tile. Because the PVC tape will soften when heated (exceeding the transition temperature of the plastic glass) before it enters the pressing wheel of high temperature, the stretching strength of the tape will substantially reduced, resulting in unstable supply speed of the tape. Although a servomotor can be used to drive the supply wheel, the relation between the speed of the supply wheel and that of the pressing wheel is not linear such that the error will be large. Fast and stable embossing can not be achieved only using this kind of speed comparison for control. Furthermore, pressing wrinkle or even break can easily arise from the looseness of the tape. Because the error of the embossing is large, the production efficiency can not be increased.

SUMMARY AND OBJECTS OF THE PRESENT INVENTION

Accordingly, the primary object of the present invention is to provide an automatic embossing device and method for plastic floor tile, which can eliminate the drawbacks of only using the pressing wheel to unstably drive the supply wheel in prior art. The present invention can steadily control the supply quantity and the unwinding tension of the tape such that no pressing wrinkle or break can arise. The accuracy and stability of the embossing are also increased.

Another object of the present invention is to provide an automatic embossing device and method for plastic floor tile, wherein selection flexibility of material of the printed tape can be increased. Even material of lower stretching strength can be adopted.

Yet another object of the present invention is to provide an automatic embossing device and method for plastic floor tile, which can calculate out the speed compensation of the rotation speed of the supply control wheel using a computer. Because the speed compensation is small and instant, higher accuracy and stable rotation can be achieved.

The various objects and advantages of the present invention will be more readily understood from the following detailed description when read in conjunction with the appended drawing, in which:

DETAILED DESCRIPTION OF PREFERRED EMBODIMENT

Figure 1:
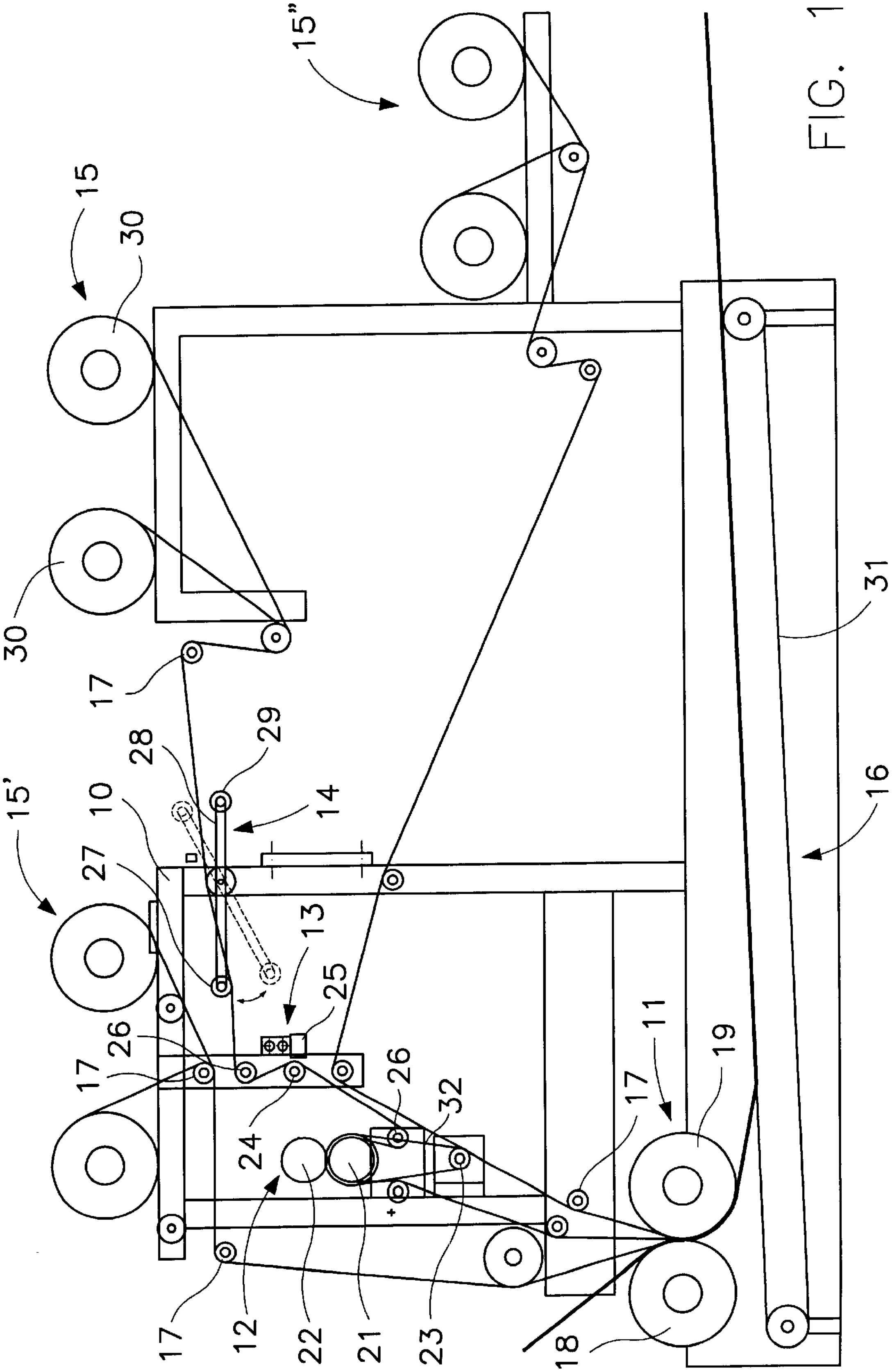
FIG. 1 is a front view of the automatic embossing device for plastic floor tile according to an embodiment of the present invention.
Figure 2:
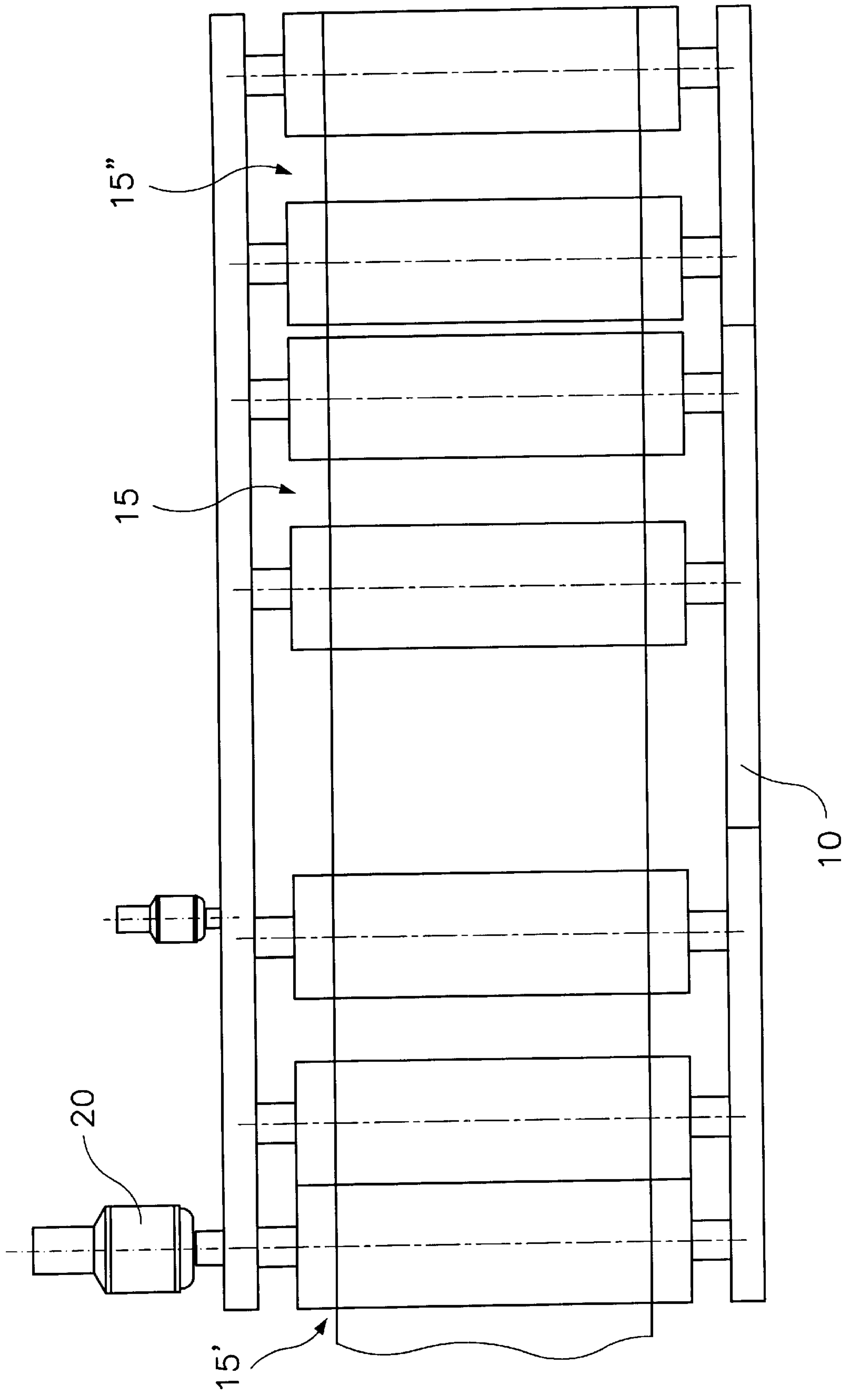
FIG. 2 is a top view of the automatic embossing device for plastic floor tile according to an embodiment of the present invention.

As shown in FIGS. 1 and 2, the present invention provides an automatic embossing device for plastic floor tile, which comprises a main frame 10, a pressing wheel module 11, a tape supply control wheel module 12, a position mark sensing module 13, a tape tension balancing module 14, a tape supply module 15, a pressed sizing conveying module 16, and a plurality of unwinding wheel 17. The main frame 10 is used to bear all modules and integrate their functions. The pressing wheel module 11 comprises a back wheel 18 and a pressing wheel 19 and uses a servomotor 20 to synchronously drive them. The back wheel 18 and the pressing wheel 19 are both of high temperature and their functions are to press and to bond each layer of tape. The tape supply control wheel module 12 is installed before the pressing wheel module and comprises two tape supply wheels 21, 22. The supply wheel 21 is driven by a servomotor 23 through a belt 32 and its function is to maintain a proper tension of the tape before entering the pressing wheel 19 and to adjust immediately the position error for accurately embossing. The position mark sensing module 13 is installed before the tape supply control wheel module 12 and comprises a roller 24 matched with a mark sensor 25. To prevent the printed tape from drifting such that the sensed signal is incorrect, two rollers 26 are installed respectively before and after the roller 24. The tape tension balancing module 14 is installed before the position mark sensing module 13 and comprises a rocking roller 27 which can be balanced by weight. The rocking roller 27 is installed at one end of a swing link 28. The swing link 28 is installed pivotably on the main frame 10. A balancing block 29 is installed at the other end of the swing link, 28 to balance the rocking roller 27. The rocking roller 27 can sensibly absorb the tension variation of the tape to stabilize the tension of the tape and thus to stabilize the supply control. The sensed signal of position mark will be correct. The tape supply module 15 is installed before the tape tension-balancing module 14 and is used to supply the printed tape. A plurality of tape supply module can be installed such as that supplies the intermediate laminar (15') or that supplies the thin tape (15"). The tape supply module 15 is installed on a slider (not shown) which can glide thereabouts. The gliding can be manually adjusted or automatically adjusted by a sensor. Each tape supply module 15 has two tape wheels 30 such that it is not necessary to turn off the machine when the tape wheel 30 is replaced. Each tape wheel 30 is appended with a damper (not shown) to prevent the tape wheel 30 from self-rotation. A frictional or an electromagnetic braking device can be adopted as the damper. The pressed sizing conveying module 16 is installed after the pressing wheel module 11 and has a belt conveyer 31. The belt conveyer 31 is driven by a speed-adjustable motor (not shown) to convey the pressed sizing and has the effects of formation and heat dissipation. The speed of the belt conveyer 31 can be adjusted according to that of the pressing wheel 19 such that the stretching quantity resulting from the speed difference can be used to adjust the cooled contraction ratio of the pressed sizing. The accuracy of the size of the printed pattern of the plastic floor tile can thus be increased. Each unwinding wheel 17 is installed on the tape conveyance path according to necessity and is used to let the tape has a proper tension. An automatic embossing device for plastic floor tile is thus formed.

Figure 3:
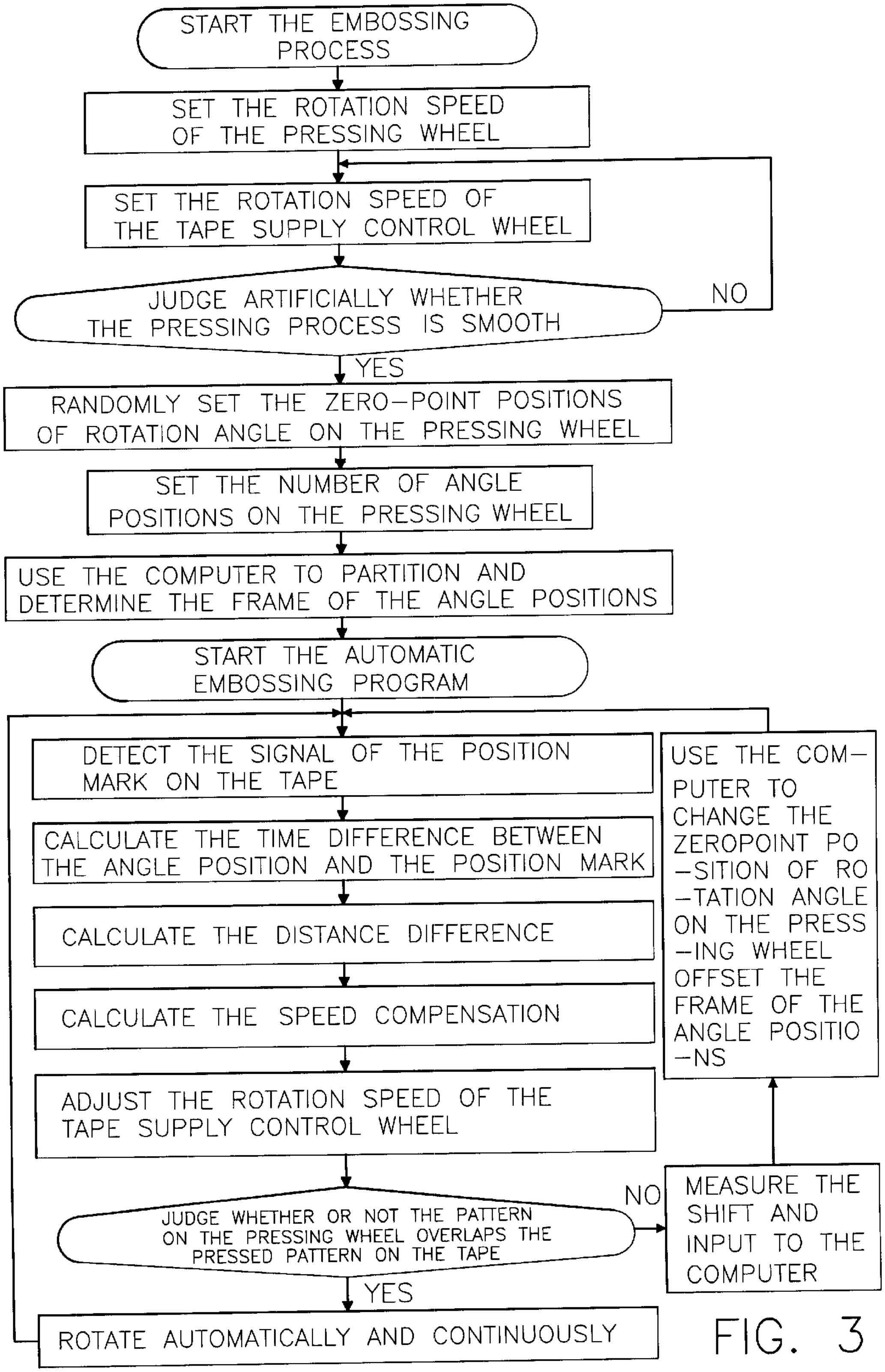
FIG. 3 is a flowchart of the automatic embossing method for plastic floor tile according to an embodiment of the present invention.

As shown in FIG. 3, an automatic embossing method for plastic floor tile comprises the following steps:

(1) Set the rotation speed of the pressing wheel according to the production condition. Use a servomotor to steadily control the rotation speed;

(2). Set the rotation speed of the tape supply control wheel to be at a certain ratio to the rotation speed of the pressing wheel. The ratio is less than 1, that is, the rotation speed of the tape supply control wheel is smaller than that of the pressing wheel. A proper stretching tension is built between these two modules. The magnitude of the tension is adjusted according to the material characteristics (e.g., the processing temperature and the cooled contraction ratio) of the printed tape. Whether the pressing process is smooth or not is judged artificially. This can eliminate the drawbacks of only using the pressing wheel to unstably drive the supply wheel in prior art. The present invention can steadily control the supply quantity and the unwinding tension of the tape such that no pressing wrinkle or break can arise. The accuracy and stability of the embossing are also increased. Selection flexibility of material of the printed tape can be increased. Even material of lower stretching strength can be adopted.

(3). Randomly set a zero-point position of rotation angle on the pressing wheel using a button when the rotation starts. The computer then uses a software to partition and determine a plurality of angle positions from this zero-point for the signals of an encoder on the servomotor. In addition to the printed pattern, the printed tape also has position marks. The quantity of the angle positions should corresponds to that of the position marks on the printed tape. The quantity of the position marks depends on the processing conditions and the material characteristics of the printed tape. The larger the quantity, the higher the adjustment frequency, and the smaller the error. However, larger quantity represents shorter adjustment distance. The adjustment acceleration or deceleration of the tape will thus be large, and the smooth of the supply of the tape and the stability of the tension of the tape will be influenced. Even the sensed signal of the position mark will be incorrect. Therefore, a proper quantity of angle positions should be set on the pressing wheel. The preferred embodiment of the present invention sets 18 angle positions on the pressing wheel, and there are 18 position marks on the length of the printed tape corresponding to each turn of the pressing wheel.

(4). When the pressing process starts, the computer compares the signal of the angle position with that of the position mark on the printed tape. A time difference is obtained to calculate out the distance difference. The computer then calculates out the speed compensation according to the rotation speed of the tape supply control wheel and adjusts immediately the rotation speed of the tape supply control wheel. The adjustment is finished before the next position mark arrives. The angle position and the position mark on the printed tape can thus be kept synchronous at any time. Because the compensation is small and instant, higher accuracy and stable rotation can be achieved.

(5). Each time when the pressing wheel is replaced and the rotation starts, the computer will automatically adjust the error of the angle position and the position mark on the printed tape. Because the zero-point position of rotation angle on the pressing wheel is randomly set, there may be a certain shift between the pattern on the pressing wheel and the printed pattern on the printed tape. The computer will automatically adjust the zero-point position of rotation angle on the pressing wheel according to the shift. Each angle positions in the software will also be changed. The pattern on the pressing wheel will overlap the printed pattern on the printed tape. When the shift is large, the computer will first adjust quickly, and adjust slowly within the distance of a position mark. Normal position adjustment is then performed. The rotation is automatic and continuous, and no adjustment is necessary.

To sum up, the present invention eliminates the drawbacks of the conventional automatic embossing technology for plastic floor tile. These drawbacks include that the supply of the tape is unstable, that the error is large, that the embossing is slow and unstable, that the pressing wrinkle or break can easily arise from the looseness of the tape, and that the production efficiency can not be increased.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

we claim:

1. An automatic embossing method for plastic floor tile comprising the steps of:

(a) initializing the automatic embossing method by:

(i) establishing a rotation speed of a pressing wheel to control an embossing rate of said automatic embossing method;

(ii) establishing a rotation speed of a tape supply control wheel to set a feed rate of a printed tape into operational contact with said pressing wheel;

(iii) establishing an arbitrary zero reference point on said pressing wheel and partitioning a plane of rotation of said pressing wheel into a plurality of angle positions proportional to a predetermined density of position marks on said printed tape;

(b) determining a time difference between an acquisition of a signal indicative of an angular displacement of one of said plurality of angle positions with respect to said arbitrary zero reference point and an acquisition of a signal corresponding to one of said position marks on said printed tape, calculating a speed compensation to be applied to said tape supply control wheel for adjusting said rotation speed of said tape supply control wheel, whereby said plurality of angle positions and corresponding ones of said position marks on said printed tape are continuously maintained spatially synchronized;

(c) evaluating the registration of a pattern on said pressing wheel and a printed pattern on said printed tape and if said pattern on said pressing wheel (1) is in registration with said printed pattern on said printed tape to within a predetermined tolerance, allowing said printed tape and a predetermined plurality of plastic floor tile components to be embossed by said pressing wheel and continuing said automatic embossing method at step (b); and, (2) is not in registration with said printed pattern on said printed tape, measuring a spatial shift between said pattern on said pressing wheel and said printed pattern on said printed tape and inputting said spatial shift into a system control means, operating said system control means to adjust said zero reference point on said pressing wheel for registering said pattern on said pressing wheel onto said printed pattern on said printed tape and continuing said automatic embossing method at step (b).

2. The automatic embossing method for plastic floor tile of claim 1, wherein the rotation speed of said pressing wheel in said step (a)(i) is controlled by a servo motor.

3. The automatic embossing method for plastic floor tile of claim 1, wherein the rotation speed of said tape supply control wheel in said step (a)(ii) is maintained at a predetermined ratio to that of said pressing wheel, said predetermined ratio being less than one.

4. The automatic embossing method for plastic floor tile of claim 1, wherein a large value of said spatial shift in step (c) causes said system control means to first adjust said pattern registration rapidly and then adjust said pattern registration slowly, a total adjustment of said pattern registration completed by the time an acquisition of a signal corresponding to a next position mark on said printed tape occurs.

* * * * *